United States Patent
Ghosh et al.

(10) Patent No.: US 11,755,824 B2
(45) Date of Patent: Sep. 12, 2023

(54) SYSTEM AND METHOD FOR PREDICTING AND MODERATING SIGNATURE LOCATIONS WITHIN ELECTRONIC DOCUMENTS

(71) Applicant: Certinal Software Private Limited, Mumbai (IN)

(72) Inventors: Kanishka Ghosh, Mumbai (IN); Krishnendu Chattopadhyaya, Mumbai (IN)

(73) Assignee: Certinal Software Private Limited, Mumbai (IN)

( * ) Notice: Subject to any disclaimer, the term of this patent is extended or adjusted under 35 U.S.C. 154(b) by 0 days.

(21) Appl. No.: 17/682,765

(22) Filed: Feb. 28, 2022

(65) Prior Publication Data
US 2022/0309235 A1    Sep. 29, 2022

(51) Int. Cl.
| | |
|---|---|
| *G06F 40/00* | (2020.01) |
| *G06F 40/174* | (2020.01) |
| *G06V 30/412* | (2022.01) |
| *G06F 21/31* | (2013.01) |
| *G06F 3/0483* | (2013.01) |

(52) U.S. Cl.
CPC ............ *G06F 40/174* (2020.01); *G06F 21/31* (2013.01); *G06V 30/412* (2022.01); *G06F 3/0483* (2013.01)

(58) Field of Classification Search
CPC ...... G06F 40/174; G06F 21/31; G06F 3/0483; G06V 30/412
See application file for complete search history.

(56) References Cited

U.S. PATENT DOCUMENTS

| | | | |
|---|---|---|---|
| 8,065,527 B2 * | 11/2011 | Veluchamy | G06F 40/174 726/16 |
| 9,575,622 B1 * | 2/2017 | Allison | G06F 3/0481 |
| 9,858,548 B2 * | 1/2018 | Allison | G06Q 10/10 |
| 10,482,287 B2 * | 11/2019 | Kumar | G06F 21/64 |
| 10,552,525 B1 * | 2/2020 | Allison | G06Q 10/10 |

(Continued)

OTHER PUBLICATIONS

Bluebeam, "Creating Forms", Sep. 18, 2020, 2 pages https://web.archive.org/web/20200918235008/https://support.bluebeam.com/online-help/revu20/Content/RevuHelp/Menus/Tools/Form/Creating-Forms.htm.*

(Continued)

*Primary Examiner* — William L Bashore
*Assistant Examiner* — David Faber
(74) *Attorney, Agent, or Firm* — Preston Smirman; SMIRMAN IP LAW, PLLC

(57) ABSTRACT

Systems and methods for predicting and moderating signature locations include an electronic document to be signed, a user of the electronic document, and a user communication device. The user provides free text inputs in the text input module of the system for the requirements of signatures in the document. A signature fields finder module analyses inputs of the user based on heuristic training patterns and screens and maps all the pages of the document for placing signature boxes. The system then places signature tags in the signature boxes. The user selects the signer parties present in the signature boxes and the system compiles signature tags for that party. The user. using the signature tag moderator module, can add, delete or adjust the signature tags and the user gets to see all the relevant pages of the document with compiled signature tags for moderation purposes by the user.

17 Claims, 2 Drawing Sheets

(56) References Cited

U.S. PATENT DOCUMENTS

| | | | |
|---|---|---|---|
| 11,423,164 B2* | 8/2022 | Bartlett | G06F 21/645 |
| 2004/0205534 A1* | 10/2004 | Koelle | G06Q 20/4012 |
| | | | 705/72 |
| 2008/0209313 A1* | 8/2008 | Gonser | G06F 40/186 |
| | | | 715/255 |
| 2008/0235577 A1* | 9/2008 | Veluchamy | G06F 21/6209 |
| | | | 715/268 |
| 2011/0093777 A1* | 4/2011 | Dunn | G06F 40/174 |
| | | | 715/268 |
| 2011/0093807 A1* | 4/2011 | Dunn | G06Q 10/10 |
| | | | 715/780 |
| 2012/0092374 A1* | 4/2012 | Sarnoff | H04N 1/3871 |
| | | | 345/634 |
| 2012/0303962 A1* | 11/2012 | Ghani | G06Q 20/3821 |
| | | | 713/176 |
| 2013/0097480 A1* | 4/2013 | Allison | G06Q 10/10 |
| | | | 715/223 |
| 2014/0019855 A1* | 1/2014 | Kim | G06Q 10/10 |
| | | | 715/268 |
| 2015/0178252 A1* | 6/2015 | Dunn | G06F 40/143 |
| | | | 715/234 |
| 2017/0017646 A1* | 1/2017 | Kumar | G06F 21/00 |
| 2017/0169518 A1* | 6/2017 | Guzman | G06F 16/38 |
| 2018/0046605 A1* | 2/2018 | Hickey | G06F 3/04883 |
| 2019/0303411 A1* | 10/2019 | Wilson | G06V 30/412 |
| 2019/0311021 A1* | 10/2019 | Hayslett | H04L 9/3247 |
| 2022/0012406 A1* | 1/2022 | D'Oria | G06V 30/10 |
| 2022/0035990 A1* | 2/2022 | Kaza | G06F 40/117 |
| 2022/0101061 A1* | 3/2022 | Mehta | G06F 11/3072 |

OTHER PUBLICATIONS

Kassuba, Lori, "Designing online forms for auto field detection using Acrobat 9", Acrobat Library, Feb. 17, 2010, 7 pages https://acrobatusers.com/tutorials/designing-forms-auto-field-detection-adobe-acrobat/.*

StepOver Internationalm "webSignatureOffice", Nov. 5, 2016, 5 pages https://www.stepover.com/fileadmin/stepover.de/media/Dokumente/webSignatureSuite-flyer.pdf.*

* cited by examiner

SYSTEM AND METHOD FOR PREDICTING AND MODERATING SIGNATURE LOCATIONS WITHIN ELECTRONIC DOCUMENTS

CROSS-REFERENCE TO RELATED APPLICATION

The instant application claims priority to Indian Patent Application Serial No. 202121013062, filed Mar. 25, 2021, pending, the entire specification of which is expressly incorporated herein by reference.

FIELD OF THE INVENTION

The present invention relates to electronic signatures in electronic documents and more particularly, to system and method for predicting and moderating signature locations within electronic documents.

BACKGROUND OF THE INVENTION

Contracts and other legal documents requiring signatures are used daily in commerce. These documents need to be signed, stored and routed to the necessary location in a controllable fashion. As electronic documents and electronic signatures become more universally accepted and demanded there exists a need to create a signing process that is controlled electronically. Historically, electronic systems that allow for electronic document signature typically apply the signature to the entire document. Documents such as contracts are not marked up for specific signature locations, initial locations, data collection locations and other areas for signatures to appear in the proper locations. This lack of ability to mimic the paper process led to slow adoption. More recently, some newer electronic systems allow the user to place signing locations into the document but require the user to manually create the workflow and authentication steps for the document via time consuming and tedious processes, such as the insertion or creation of tag locations throughout the document where the signatures are to be placed. Therefore, there exists a need for automating the process of placing exact signature locations, workflow, and recipient tasks into these documents so they can be sent for e-signature more easily, this is especially true for documents that contain multiple signing locations, multiple recipients and more complicated workflows.

In the realm of electronic signatures, however, existing electronic signature methods fail to adequately deal with a variable signature location. For example, a mortgage loan document (or any other number of documents) may have certain terms that will be included in the document or excluded from the document as the terms of the document are negotiated by the parties. Furthermore, a mortgage loan document used by a bank with respect to party A will have different terms than a similar document used by the bank with respect to party B. The addition or removal of terms, the addition, removal, or change of the total number of signing parties, and many other differences or changes cause the documents to have differing numbers of total pages, differing physical locations for signature within one or more pages, and other changes that make it difficult to use a single electronic signature location across a wide variety of documents.

When electronic documents are uploaded within electronic signing applications, users find it very difficult to scroll and locate signature boxes to place signature tags for signing purpose. Electronic documents are very lengthy documents that usually run into 100-200 pages and it is very difficult for the users to scroll through the entire document set to check as to where signature places are there and as to where the user is required to insert signature tag for signing process. Therefore, there is felt a need to provide system intelligent application to predict and moderate signature locations in electronic documents and auto populate signature tags at relevant locations within the document based on one command/inputs of the user.

DEFINITIONS

The expression "document" as used hereinafter in this specification refers to, but is not limited to, an electronic document including e-contracts, commercial contracts, customer contracts, vendor contracts, non-disclosure agreements, etc. in a computer readable format.

The expression "user" as used hereinafter in this specification refers to, but is not limited to, the individual/natural entity that may be the creator of the document, sender of the document, any recipient of the document or any signer of the document.

The expression "signature box" as used hereinafter in this specification refers to, but is not limited to, the usual signing place location which is present in the document to be signed, wherein the signers' name, designation and/or dates are tabulated for signing purpose.

The expression "signature tag" as used hereinafter in this specification refers to, but is not limited to a marking or indication to direct or specify the user that he or she needs to sign at that place.

OBJECTS OF THE INVENTION

The primary object of the present invention is to provide a system and method for predicting signature locations within electronic documents.

Yet another object of the present invention is to provide a system and method for predicting signature locations within electronic documents for placing signature tags using free text inputs by the user.

Yet another object of the present invention is to provide a system and method for predicting signature location/box within electronic documents for placing signature tags and auto populate/compile the signature tags at relevant locations within the electronic document based on at least one command/inputs of the user.

Yet another object of the present invention is to provide a system and method for predicting and placing the names of the signers and the signature date tags locations within electronic documents.

Yet another object of the present invention is to provide a system and method for presenting a signature tag moderator screen to the user with easy view of relevant pages of the document which are tagged by the system, so that the user can moderate the pre-tagged pages by removing or modifying any signature tags which may not be required to be placed.

SUMMARY OF THE INVENTION

Before the present invention is described, it is to be understood that present invention is not limited to particular methodologies and materials described, as these may vary as per the person skilled in the art. It is also to be understood that the terminology used in the description is for the purpose of describing the particular embodiments only, and is not intended to limit the scope of the present invention.

The embodiment of the present invention describes the system and method for predicting and moderating signature locations within documents especially electronic documents. Embodiments of the invention may be used with any type of document where one or more signatures are needed.

In the given embodiment of the invention, the system comprises of a user communication device, user interface, a set of computer readable instructions which can be provided by the user by means of the communication interface, a processing unit operably associated with the each of the communication devices and adapted to execute the instructions provided by the user and a computer readable memory storage medium capable of storing the instructions provided by the user. The user of the system can browse and upload the electronic document that has to be signed from the user's communication device. Once the electronic document to be signed is available in the user device, the system can help predict the signature boxes in the document for the user.

According to the embodiment of the present invention, on the screen having the electronic document in the system, there is a "signature fields finder" module. This module is operable by the user. On enabling the "signature fields finder" module, the system predicts and locates signature boxes for signatures in the selected electronic document having multiple pages. The "signature fields finder" module can also predict signer name and signature date locations and places the signature tags in the electronic document.

According to the embodiment of the present invention, there is provision to enter text inputs in the text input module of the system that is present on the same screen on which the electronic document is seen. The user of the system provides free text inputs in the designated place on the screen. These text inputs are instructions to the system for predicting locations in the selected electronic document as to where the signature tags need to be placed for signing purposes. The user is required to mention free text inputs to the system as to how they want the document to be signed and where the signature tags should be placed.

According to the embodiment of the present invention, based on the user inputs, the system will predict the signature boxes in the selected electronic document. Once the system predicts the signature box in the electronic document, the system places signature tags in the predicted signature boxes in the selected document. The system further presents a "signature tag moderator" module to the user on the screen of the user interface. The "signature tag moderator" module presents the user with easy view of relevant pages of the electronic document which are tagged by the system with signature tags, so that the user can moderate the pre-tagged pages by removing or modifying any signature tags which may not be required to be placed in the electronic document.

According to the embodiment of the invention, the "signature tag moderator" module identifies the relevant pages of the electronic document with signature tags and populates the signature tags by adding or deleting or adjusting signature tags based on the initial inputs from user. The system provides a display screen as user interface, wherein the user gets to see all relevant pages of the electronic document on the screen wherein the system auto populates signature tags for moderation purposes by the user. The user then selects relevant pages of the electronic document wherein moderations are required and is provided with actions selected from add, delete and/or modify for moderation and the user can finalize the pages of the electronic document which are required to be signed. The system suggests that whether the signature tag present in the electronic document has right authorities for signature or not based on mapping the inputs of the user.

BRIEF DESCRIPTION OF THE DRAWINGS

A complete understanding of the present invention may be made by reference to the following detailed description which is to be taken in conjugation with the accompanying drawing. The accompanying drawing, which is incorporated into and constitutes a part of the specification, illustrates one or more embodiments of the present invention and, together with the detailed description, it serves to explain the principles and implementations of the invention.

DETAILED DESCRIPTION OF INVENTION

Figure 1:
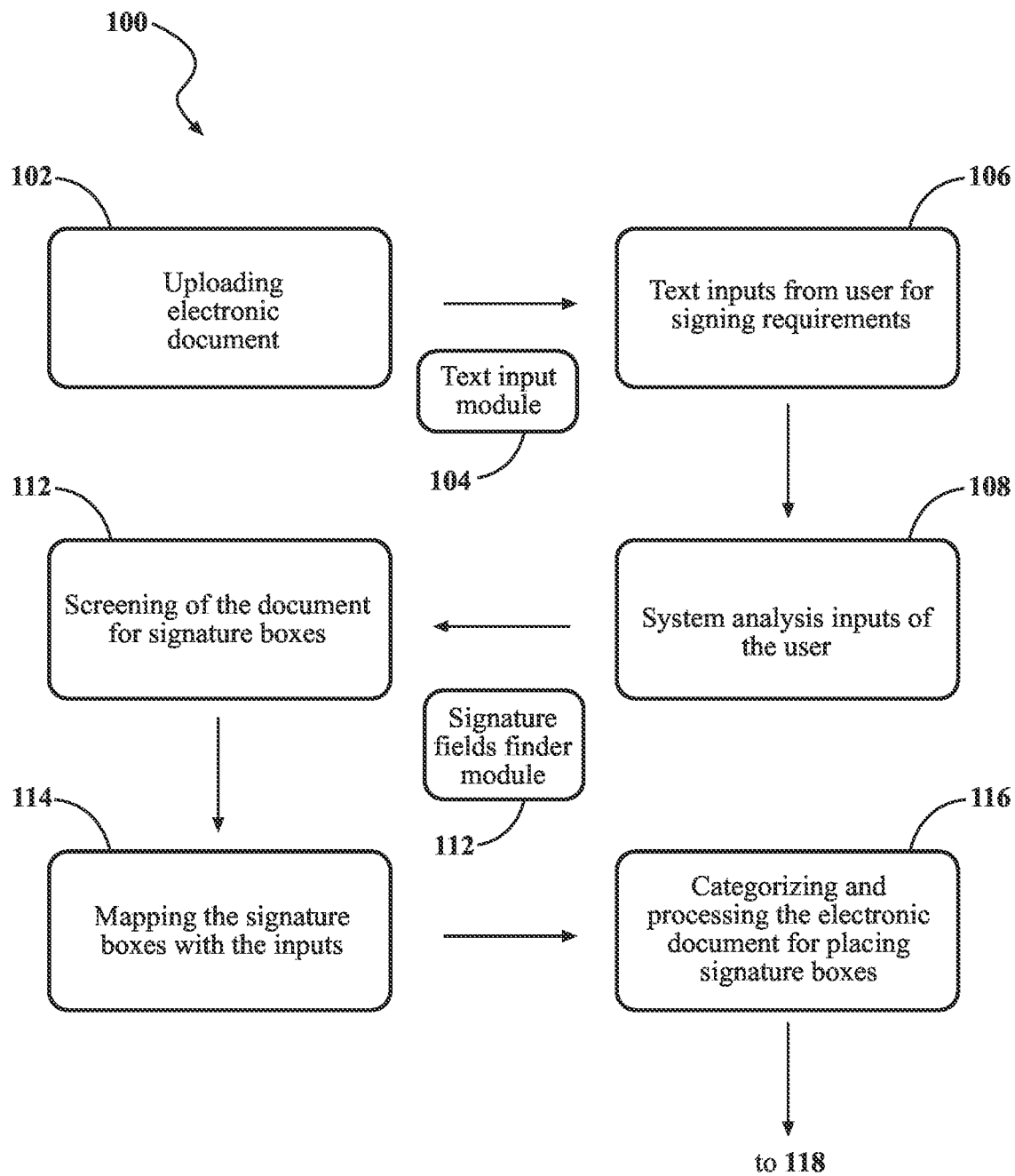
FIG. 1 is a flow diagram for the method of predicting signature locations in an electronic document according to an embodiment of the invention.
Figure 2:
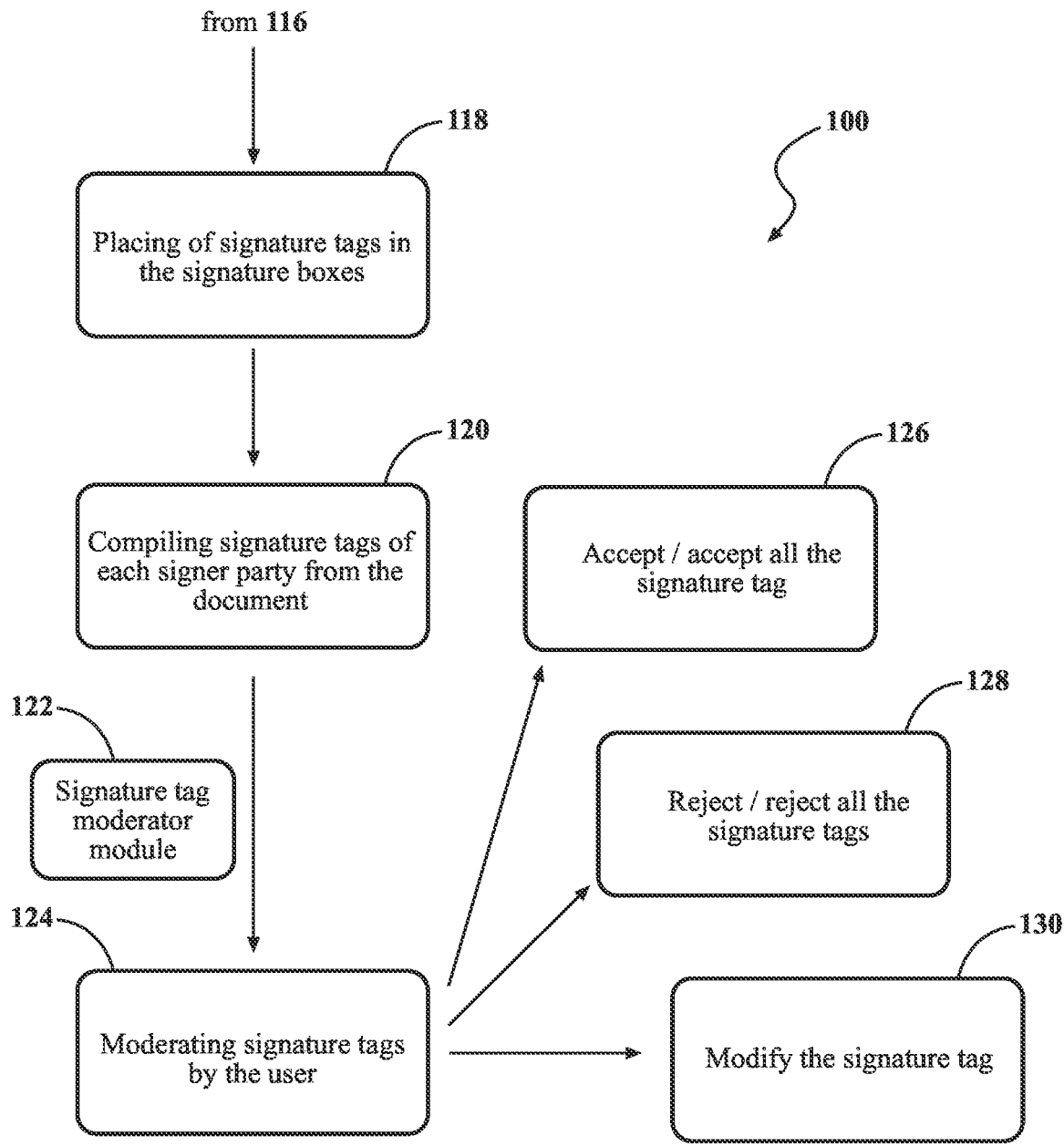
FIG. 2 is a flow diagram for the method of moderating signature locations in an electronic document according to an embodiment of the invention.

Before the present invention is described, it is to be understood that this invention is not limited to particular methodologies described, as these may vary as per the person skilled in the art. It is also to be understood that the terminology used in the description is for the purpose of describing the particular embodiments only, and is not intended to limit the scope of the present invention. Throughout this specification, the word "comprise," or variations such as "comprises" or "comprising," will be understood to imply the inclusion of a stated element, integer or step, or group of elements, integers or steps, but not the exclusion of any other element, integer or step, or group of elements, integers or steps. The use of the expression "at least" or "at least one" suggests the use of one or more elements or ingredients or quantities, as the use may be in the embodiment of the invention to achieve one or more of the desired objects or results. Various embodiments of the present invention are described below. It is, however noted that the present invention is not limited to these embodiments, but rather the intention is that modifications those are apparent are also included.

The present invention describes the system and method for predicting and moderating signature locations within documents especially electronic documents. Embodiments of the invention may be used with any type of document where one or more signatures are needed. Examples of such documents include e-contracts, commercial contracts, customer contracts vendor contracts, non-disclosure agreements, etc.

In the given embodiment of the invention, the system (100) comprises of a user communication device, user interface, a set of computer readable instructions which can be provided by the user by means of the communication interface, a processing unit operably associated with the each of the communication devices and adapted to execute the instructions provided by the user and a computer readable memory storage medium capable of storing the instructions provided by the user. The user of the system can browse and upload the electronic document (102) that has to be signed from the user's communication device such as personal computers, desktops, laptops, handheld devices. The electronic documents may be PDF (portable document format) documents or WORD documents. Once the electronic document to be signed is available in the user device, the system can help predict the signature boxes in the document for the user. Signature box are signature spaces which are present in any electronic document, wherein the parties' names, designation or dates are mentioned. It is the place for signing in the electronic document. In the given context, the user can be the creator, sender or one or more recipients of the electronic documents who are the signatories in that documents.

In the given embodiment of the present invention, there is provision to enter text inputs in the text input module (104) of the system that is present on the same screen on which the electronic document is seen. The user of the system provides free text inputs (106) in the designated place on the screen. These text inputs are instructions to the system for predicting locations in the selected electronic document as to where the signature tags need to be placed for signing purposes. The user is required to mention free text inputs to the system as to how they want the document to be signed and where the signature tags should be placed. Some examples of free text inputs for explanatory purposes are provide below:

1. In a certain scenario, the user input can be—insert signature box on main document and all annexures, schedules, exhibits—to insert signatures box on all the pages of the electronic document.

2. In other scenarios the user input can be—insert signature box only on the main agreement and not on schedules, annexures or exhibits (for few selected pages of the electronic document).

3. In some other scenarios, the user input can be—insert signature box on last page of the document.

In the given embodiment, on the screen having the electronic document in the system, there is a "signature fields finder" module (110). This module is operable by the user. On enabling the "signature fields finder" module, (110) the system screens the document for signature boxes (112) and predicts and locates signature boxes for signatures in the selected electronic document having multiple pages. The "signature fields finder" module (110) can also predict signer name and signature date locations and places the signature tags in the electronic document. Based on the types of user inputs listed above, the system will predict the signature boxes in the selected electronic document. Once the system predicts the signature box in the electronic document, the system places signature tags (118) in the predicted signature boxes in the selected document. The system further presents a "signature tag moderator" module (122) to the user on the screen of the user interface. The "signature tag moderator" module (122) presents the user with easy view of relevant pages of the electronic document which are tagged by the system with signature tags, so that the user can moderate the pre-tagged pages by removing or modifying any signature tags which may not be required to be placed in the electronic document (124).

In the given embodiment, the "signature tag moderator" module (122) identifies the relevant pages of the electronic document with signature tags and populates the signature tags by adding or deleting or adjusting signature tags based on the initial inputs from user. The system provides a display screen as user interface, wherein the user gets to see all relevant pages of the electronic document on the screen wherein the system auto populates signature tags for moderation purposes by the user. The user then selects relevant pages of the electronic document wherein moderations are required and is provided with actions selected from add, delete and/or modify for moderation and the user can finalize the pages of the electronic document which are required to be signed. The system suggests that whether the signature tag present in the electronic document has right authorities for signature or not based on mapping the inputs of the user.

The working process of the system is described below:

Uploading the electronic document to be signed in the system (102): The user browses the electronic document to be signed from the user's communication device and uploads the electronic document in the system.

Inputs from user for signing the document (106): The user provides free text inputs to the system in the text input module (104) of the system for the requirements of signatures in the selected electronic document.

Analyzing inputs of user based on heuristic training patterns (108): The system with the help of "signature fields finder" (110) module performs analysis of the inputs from the user based on heuristic training patterns.

Screening the document for signature boxes present on the document (112): The system screens the document for signature boxes on all the pages of the document.

Mapping the signature boxes with the inputs (114): The system maps all the pages with signature boxes with the inputs from the user to decide whether that page needs to have signature box or does not need to have signature box.

Categorizing the document (116): The system then categorizes the document into the main document, schedules, exhibits or annexures based on heuristic training patterns of the system.

Processing document based on the inputs (116): The system then processes the selected document bases on the user inputs. For example, if only the main document needs to be signed, the system deletes all the signature boxes from the remaining pages of the document like annexures, exhibits, etc. Alternatively, if all the pages of the document (main document, annexures, etc.) are required to be signed, then the system does not delete any signature box and conducts a check to ensure that all the pages of the document have signature box at the required places in the document. In case if some signature boxes are missing at any required place on any page of the document, the system provides suggestions to add the signature box at the required places in the document.

Placing of signature tags (118): Upon prediction of pages of the document and signature box where signature needs to be placed, signature tags of users are placed in the signature box by the system.

Compiling signature tags (120): Post identifying signature boxes on the pages of the document, the system interacts with user to select the signer parties present in signature box. If the user selects one of the signer parties present in signature box, the system auto populates and compiles signature tags for that signer party on the already identified and predicted pages and on all signature boxes. Further, the system puts tags for the subsequent parties present in the signature boxes. The user can enter the inputs of the name or designation of the signer in the system. The system then maps the words in the signature box as to where that name/designation is written. On the mapped signature box, the system then affixes a signature tag of the signer. The signature tag is a marking used to indicate the user that he or she needs to sign on that place.

Moderating signature tags (124): Once the signature tags are placed in the electronic document, the system displays the "signature tag moderator" module (122) to the user. The system upon predicting the signature boxes for signature tags and identifying relevant pages of the electronic document for signature tags, and populates the signature tags.

The user is presented with options to moderate the signature tags by adding or deleting or adjusting signature tags based on the initial inputs from user. The system provides a display screen as tag moderator user interface, wherein the user gets to see all relevant pages of the electronic document on the screen wherein the system auto populates signature tags for moderation purposes by the user through user interface. The user then selects relevant pages of the electronic document wherein moderations are required and is provided with actions selected from add, delete and/or modify for moderation and the user can finalize the pages of the electronic document which are required to be signed.

a. The "signature tag moderator" module's result summary screen for a given page of the electronic document will display the "accept" or "reject" or "change" tabs against each of signature tag proposed in the given page of the electronic document.

b. Using this "signature tag moderator" module's result summary screen for a given page, the user can accept the proposed signature tag and the recipient assignment for the signature tag using the "accept" (126) tab, or reject the proposal using the "reject" tab (128) for each such proposed and placed tag for that page. The user can also click on "accept all" tab to accept all proposed signature tags, or "reject all" tab to reject all proposed tags for a page.

c. Using the "change" tab (130), the user can change the proposed tag type to other tag types (e.g., signature to signature block, digital signature, or stamp) at the proposed place of signature tag in the electronic document. Sender can also change the proposed recipient and assign the tag to another recipient.

Authentication check of the signature tags: Based on the user inputs, the system maps the inputs with the signature tags and suggests whether or not, the signature tag has right designations and/or authorities for signing the electronic documents.

Region specific requirement check of the signature tags: With the help of user interface, the user provides inputs for which region in the world, the electronic document is required to be signed. Based on the region, the system will map with the database of law of that particular region to check if signature needs to be done only by certain authoritative positions for e.g., directors or by any employees. If as per the law of the particular region, only the director is required to sign, the system will present a suggestion to user to change designation/authority of the signer from any employee to director.

Examples of Working of the Embodiment

We can take examples of different scenarios as listed above to understand the working the system and the method:

Scenario 1—Lets take the example where user has provided input—insert signatures only on MSA and not on schedule, annexures or exhibits.

With this user input, the system predicts and identifies whether on any page of the document, a signature box is present or not, based on heuristic pattern training provided to the system.

If the system identifies signature box on any page, the system further identifies whether that page is an annexure/exhibit or schedules or main document page-based on heuristic pattern training.

The system then maps the document with the input command of the user to decide whether those exhibits, schedules or annexures are required to be signed in the signature box or signature box are required to be deleted and removed from such pages. If the signature boxes are required to be removed, the system will delete those signature boxes that are not required.

Scenario 2—Now let us take another example, where the user has provided input—insert signatures on main document and all annexures and schedules and exhibits or please insert signatures on all parts of the document.

With this user input, if the system identifies that on any particular page of the document, the signature box is not there based on heuristic pattern training provided to the system, the system will identify whether that page is an annexure/exhibit or schedules or main document page.

The system then maps the document with the input command of the user to decide whether those exhibits, schedules are required to be signed or signature tags are required to be added. If those signature boxes are required to be added, the system will insert similar signature box in those pages that do not have the signature box.

Scenario 3—In this example, the user input is—put signature tag on last page of document.

With this user input, the system based on heuristic training will scroll and screen to the last page of the document and check if signature box is present on the last page. If signature box is not present on the last page, the system will place a signature box.

The embodiment of the present invention provides a system for predicting signature locations in electronic documents. The system recognizes the user inputs on the basis heuristic patterns and analyzes the document to understand as to where signature tags are present on the document and decides whether to add or delete signature tags from the required pages on the document.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device or system. Examples of a computing device or system may include, but are not limited to, an electronic book reading device, a computer workstation, a terminal computer, a server computer, a handheld or mobile device (e.g., a tablet computer, a personal digital assistant "PDA," a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

As used herein, the term "mobile device" is intended to encompass any form of programmable computing device as may exist, or will be developed in the future, that implements a communication module for wireless voice and data communications, including, for example, cellular telephones, personal data assistants (PDA's), palm-top computers, laptop, and notebook computers, wireless electronic mail receivers (e.g., the BLACKBERRY™ and TREO™ devices), multimedia Internet enabled cellular telephones (e.g., the BLACKBERRY STORM™, and similar personal electronic devices that include a wireless communication module, processor and memory.

The computer device or system may also include an input device. In one example, a user of the computer device or system may enter commands and/or other information into computer device or system via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device or system via a storage device (e.g., a removable disk drive, a flash drive, etc.) and/or a network interface device. A network interface device, such as network interface device may be utilized for connecting the computer device or system to one or more of a variety of networks and/or one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device or system via a network interface device.

The computer device or system may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device or system may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

While considerable emphasis has been placed herein on the specific elements of the preferred embodiment, it will be appreciated that many alterations can be made and that many modifications can be made in preferred embodiment without departing from the principles of the invention. These and other changes in the preferred embodiments of the invention will be apparent to those skilled in the art from the disclosure herein, whereby it is to be distinctly understood that the foregoing descriptive matter is to be interpreted merely as illustrative of the invention and not as a limitation.

What is claimed is:

1. A computer implemented system for predicting and moderating signature locations within electronic documents, comprising:

at least one electronic document to be signed by a user of the electronic document from a user communication device with a user interface; and a set of computer readable instructions which are provided by the user by means of the user interface, a processing unit operably associated with the user communication device and adapted to execute the instructions provided by the user and a computer readable memory storage medium capable of storing the instructions provided by the user, wherein the user communication device comprises:

a text input module configured for free text inputs by the user to the system for the requirements of signatures in the electronic document;

a signature fields finder module configured to analyze user inputs based on a first set of heuristic training patterns, screen all pages of the electronic document for existing signature boxes present in the document and predict a signer's name and signature date locations and place signature tags in the electronic document by mapping all the pages of the electronic document having existing signature boxes with the user inputs to decide placement of new signature boxes, categorizing the electronic document into groups based on a second set of heuristic training patterns of the system, processing the electronic document based on the user inputs and placing the new signature boxes and the signature tags in all signature boxes, compiling the signature tags as the user selects signer parties present in each of the signature boxes and the system auto populates and compiles signature tags for that signer party on identified and predicted pages and on all signature boxes; and a signature tag moderator module configured to moderate signature tags by adding or deleting or adjusting signature tags based on the user inputs and the user gets to see all relevant pages of the electronic document on a screen wherein the system auto populates signature tags for moderation purposes by the user through the user interface.

2. The system as claimed in claim 1, wherein the free text inputs by the user in the text input module are instructions to the system for predicting locations in the electronic document as to where the signature tags need to be placed for signing purposes.

3. The system as claimed in claim 1, wherein the free text inputs are at least one selected from insert signature boxes on all pages of the document, insert signature boxes on only main page of the document or insert signature boxes on only certain categories in the document.

4. The system as claimed in claim 1, wherein using the signature tag moderator module's result summary screen for a given page of the document, the user accepts a proposed signature tag using an accept tab, or rejects the proposed signature tag using the reject tab, for each proposed and placed tag for that page.

5. The system as claimed in claim 1, wherein the user uses an accept all tab to accept all proposed signature tags, or a reject all tab to reject the all proposed tags for a page of the electronic document.

6. The system as claimed in claim 1, wherein using a change tab, the user changes a proposed tag type to other tag types at a proposed place of signature tag in the electronic document.

7. The system as claimed in claim 1, wherein based on the user inputs, the system maps the user inputs with the signature tags and suggests whether or not, the signature tags has right designations or authorities for signing the electronic documents.

8. The system as claimed in claim 1, wherein based on user inputs of a world region where the electronic document needs to be signed, the system maps with a database of law of that particular region to check if signature needs to be done only by certain authoritative positions and accordingly presents a suggestion to user to change designation or authority of the signer of the electronic document.

9. A computer implemented method for predicting and moderating signature locations within at least one electronic document to be signed by a user from a system comprising a user communication device with a user interface, the method comprising the steps of:
uploading the electronic document to be signed from the user's communication device in the system;
providing free text inputs by the user to the system in a text input module of the system for requirements of signatures in the electronic document;
analyzing user inputs based on a first set of heuristic training patterns heuristic training patterns by signature fields finder module in the system;
screening all pages of the electronic document for existing signature boxes present in the document;
mapping all the pages of the electronic document having existing signature boxes with the user inputs to decide placement of new signature boxes;
categorizing the electronic document into groups based on a second set of heuristic training patterns of the system;
processing the electronic document based on the user inputs and placing the new signature boxes;
placing of signature tags in all signature boxes by the system;
compiling signature tags by the system as the user selects signer parties present in each of the signature boxes and the system auto populates and compiles signature tags for that signer party on identified and predicted pages and on all signature boxes; and
moderating signature tags by the user using the signature tag moderator module by adding or deleting or adjusting signature tags based on the user inputs from user and the user gets to see all relevant pages of the electronic document on a screen wherein the system auto populates signature tags for moderation purposes by the user through the user interface.

10. The method as claimed in claim 9, wherein the free text inputs by the user in the text input module are instructions to the system for predicting locations in the electronic document as to where the signature tags need to be placed for signing purposes.

11. The method as claimed in claim 9, wherein the free text inputs are at least one selected from insert signature boxes on all pages of the document, insert signature boxes on only main page of the document or insert signature boxes on only certain categories in the document.

12. The method as claimed in claim 9, wherein the signature fields finder module predicts a signer's name and signature date locations and places the signature tags in the electronic document.

13. The method as claimed in claim 9, wherein using the signature tag moderator module's result summary screen for a given page of the document, the user accepts a proposed signature tag using an accept tab, or rejects the proposed signature tag using the reject tab, for each proposed and placed tag for that page.

14. The method as claimed in claim 9, wherein the user uses an accept all tab to accept all proposed signature tags, or a reject all tab to reject the all proposed tags for a page of the electronic document.

15. The method as claimed in claim 9, wherein using a change tab, the user changes a proposed tag type to other tag types at a proposed place of signature tag in the electronic document.

16. The method as claimed in claim 9, wherein based on the user inputs, the system maps the user inputs with the signature tags and suggests whether or not, the signature tags has right designations or authorities for signing the electronic documents.

17. The method as claimed in claim 9, wherein based on user inputs of a world region where the electronic document needs to be signed, the system maps with a database of law of that particular region to check if signature needs to be done only by certain authoritative positions and accordingly presents a suggestion to user to change designation or authority of the signer of the electronic document.

* * * * *